United States Patent [19]
Burgett

[11] Patent Number: 5,230,630
[45] Date of Patent: Jul. 27, 1993

[54] SUTURE TRAINING DEVICE

[76] Inventor: Richard Burgett, 2901 Susan Stone Dr., Urbana, Ill. 61801-7016

[21] Appl. No.: 915,324

[22] Filed: Jul. 20, 1992

[51] Int. Cl.[5] .......................................... G09B 23/28
[52] U.S. Cl. ................................. 434/262; 434/267
[58] Field of Search ............................. 434/262, 267

[56] References Cited

U.S. PATENT DOCUMENTS

| | | | |
|---|---|---|---|
| 3,775,865 | 12/1973 | Rowan | 434/262 |
| 4,321,047 | 3/1982 | Landis | 434/262 |
| 4,386,917 | 6/1983 | Forrest | 434/267 |
| 5,149,270 | 9/1992 | McKeown | 434/262 |
| 5,180,308 | 1/1993 | Garito et al. | 434/262 |

Primary Examiner—John J. Wilson
Assistant Examiner—Cindy A. Cherichetti
Attorney, Agent, or Firm—Leon Gilden

[57] ABSTRACT

A transparent housing arranged for interfolding includes a cavity accessed through open end walls and transparent side, bottom, and top wall structure. The device mounts a rigid rod within the housing for training of suturing within a body cavity, wherein the top wall of the housing includes resilient clamping structure to secure simulation skin to the top wall of the housing for assisting in suturing. Upon removal of the rigid wall, hinged inter-relationship of the side walls, top wall, and floor of the housing permits interfolding of the housing for ease of storage and transport.

3 Claims, 4 Drawing Sheets

SUTURE TRAINING DEVICE

BACKGROUND OF THE INVENTION

1. Field of the Invention

The field of invention relates to medical training devices, and more particularly pertains to a new and improved suture training device wherein the same is arranged to permit training in medical suturing.

2. Description of the Prior Art

Suture devices of various types to assist in suturing are exemplified in the prior art by U.S. Pat. Nos. 4,950,285; 4,901,721; and a method of suturing as set forth in U.S. Pat. No. 4,696,301.

The prior art has heretofore failed to provide for a medical device to provide for practicing of suturing in medical training and in this respect, the present invention substantially fulfills this need.

SUMMARY OF THE INVENTION

In view of the foregoing disadvantages inherent in the known types of suturing apparatus now present in the prior art, the present invention provides a suture training device wherein the same provides for a housing structure arranged to provide training for suturing within a body cavity and to an exterior surface of a patient. As such, the general purpose of the present invention, which will be described subsequently in greater detail, is to provide a new and improved suture training device which has all the advantages of the prior art suture apparatus and none of the disadvantages.

To attain this, the present invention provides a transparent housing arranged for interfolding including a cavity accessed through open end walls and transparent side, bottom, and top wall structure. The device mounts a rigid rod within the housing for training of suturing within a body cavity, wherein the top wall of the housing includes resilient clamping structure to secure simulation skin to the top wall of the housing for assisting in suturing. Upon removal of the rigid wall, hinged interrelationship of the side walls, top wall, and floor of the housing permits interfolding of the housing for ease of storage and transport.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved suture training device which has all the advantages of the prior art suture apparatus and none of the disadvantages.

It is another object of the present invention to provide a new and improved suture training device which may be easily and efficiently manufactured and marketed.

It is a further object of the present invention to provide a new and improved suture training device which is of a durable and reliable construction.

An even further object of the present invention is to provide a new and improved suture training device which is susceptible of a low cost of manufacture with regard to both materials and labor, and which accordingly is then susceptible of low prices of sale to the consuming public, thereby making such suture training devices economically available to the buying public.

Still yet another object of the present invention is to provide a new and improved suture training device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
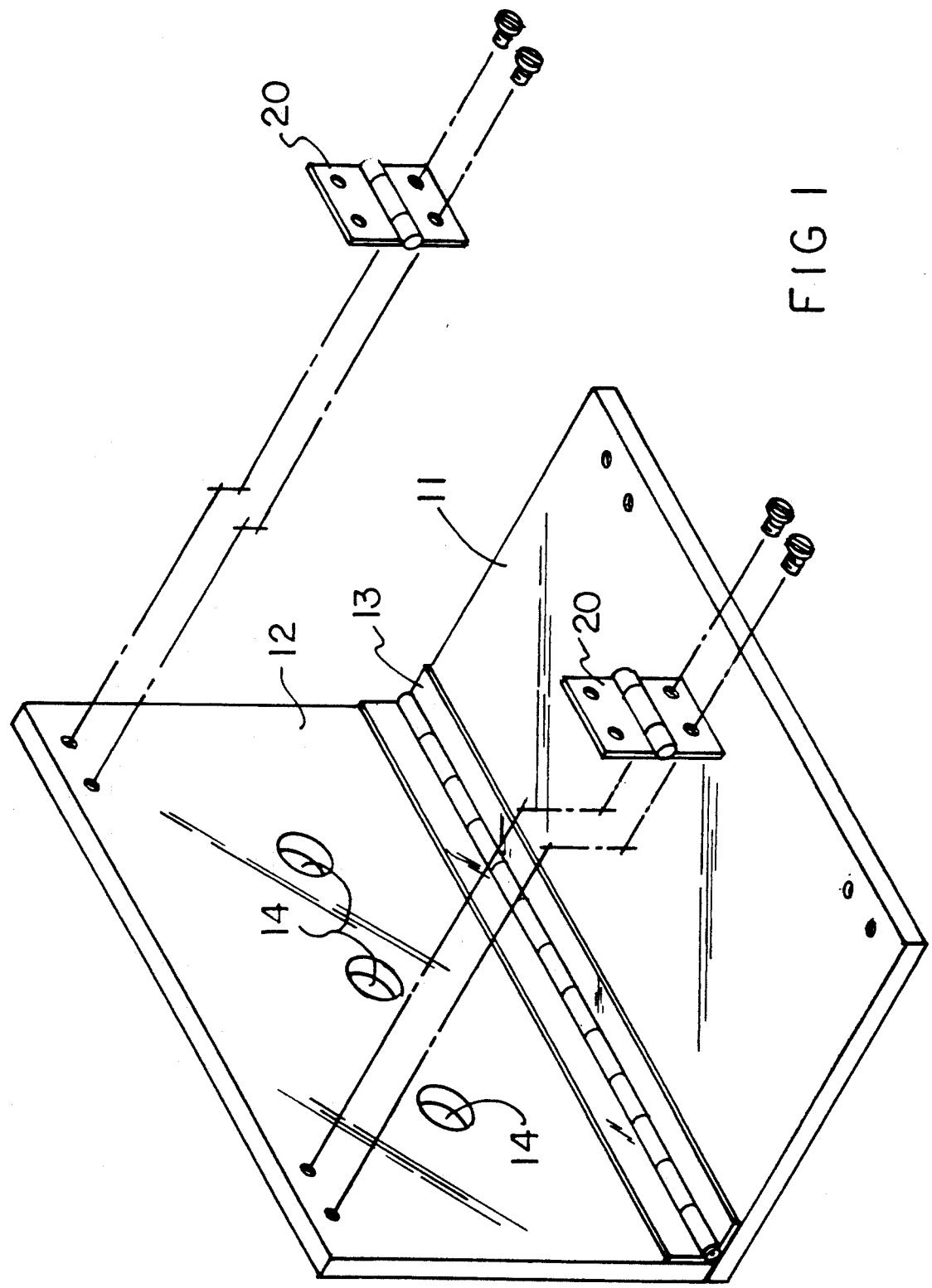
FIG. 1 is an isometric illustration of the first wall and floor of the organization.
Figure 2:
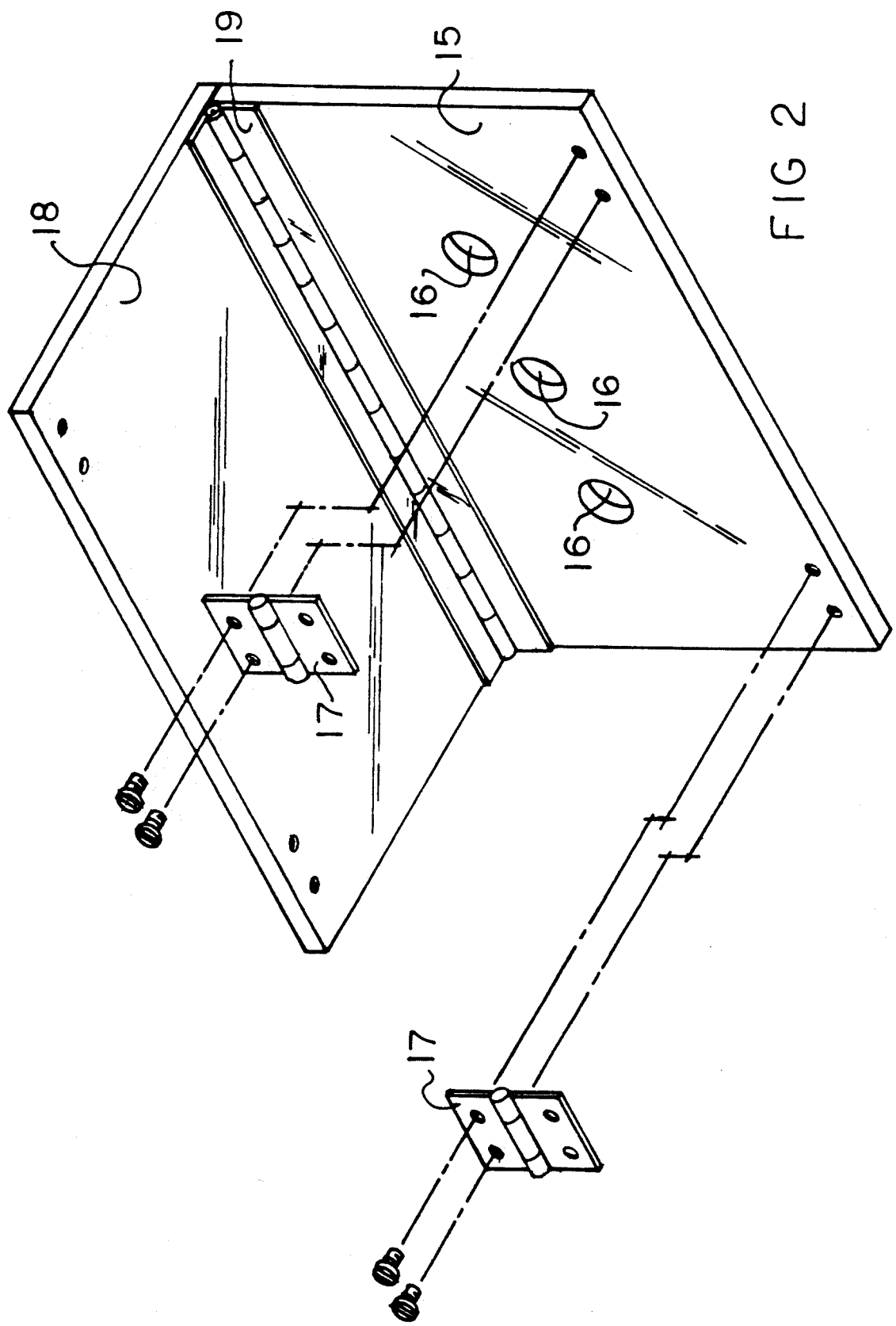
FIG. 2 is an isometric illustration of the top wall and second side wall of the organization.
Figure 3:
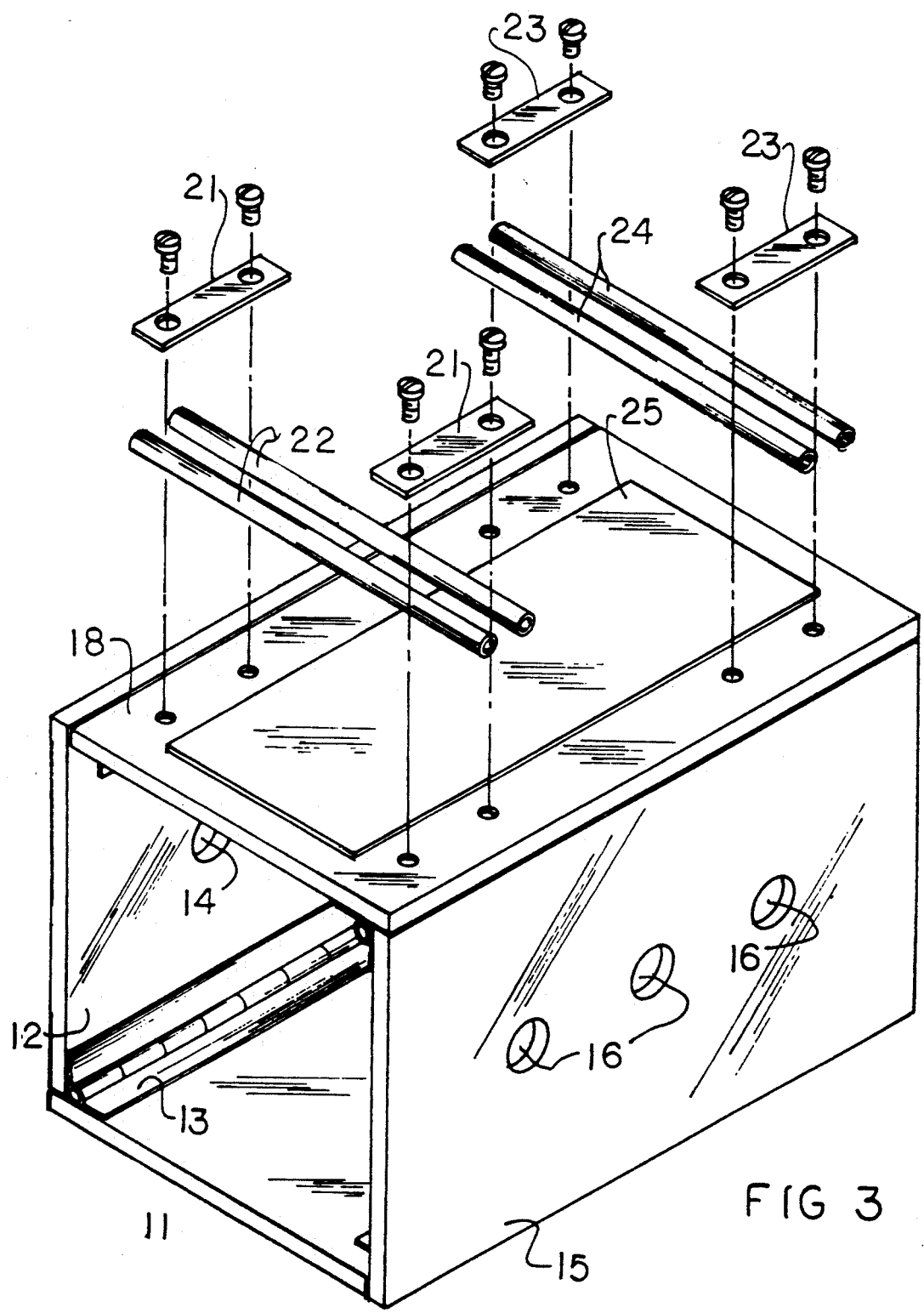
FIG. 3 is an isometric illustration of the housing indicating the latex clamp tubes arranged for securement to the top wall of the housing.

With reference now to the drawings, and in particular to FIGS. 1 to 4 thereof, a new and improved suture training device embodying the principles and concepts of the present invention and generally designated by the reference numeral 10 will be described.

Figure 4:
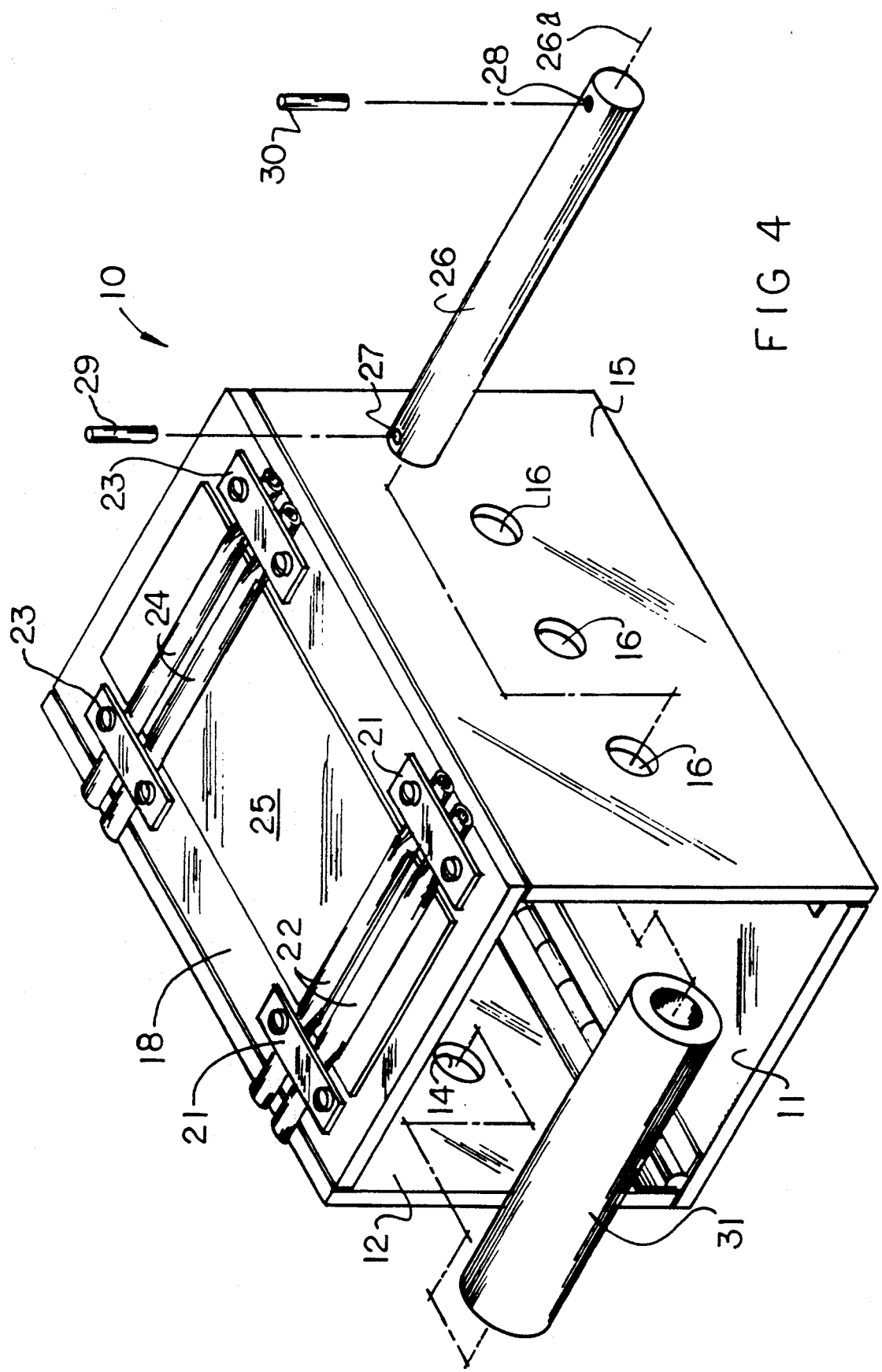
FIG. 4 is an isometric illustration of the housing, partially in exploded view, to indicate the positioning of the rigid rod and surrounding tube relative to the rigid rod within the housing.

More specifically, the suture training device 10 of the instant invention and as indicated in the FIG. 4 is directed to the simulation of suturing within a body cavity and to an exterior surface of a body as a training device. To this end, the organization includes a transparent floor plate 11 hingedly mounted to a first wall 12 about a first hinge member 13. First wall apertures 14 are directed medially of the first wall 12 spaced apart the predetermined spacing. A transparent second wall 15 (see FIG. 2) is hingedly mounted to a transparent top wall 18 about a third hinge member 19. At least one second hinge member 17 secures the second wall 15 to the floor 11, with at least one fourth hinge member 20 securing the top wall 18 to the first side wall 12. In this manner, the housing is arranged for pivotment about the first through fourth hinge members for collapsing of the organization for transport and storage. A plurality of second wall apertures 16 are directed medially of the second wall and spaced apart said predetermined spacing, wherein at least one of said second wall apertures is aligned coaxially with at least one of said first wall apertures 14.

First clamp plates 21 (see the FIGS. 3 and 4) are mounted in a parallel relationship relative to one another, with of the first clamp plates 21 secured in adjacency relative to the first wall 12, with a second of said first clamp plates 21 positioned adjacent the second wall 15. A plurality of resilient first tubes 22 are tensioned between the first clamp plates 21 in contiguous communication with a top surface of the top wall 18. Second clamp plates 23 are provided in a spaced relationship relative to the first clamp plates, wherein one of said second clamp plates 23 is positioned in adjacency to the first wall and a second of said second clamp plates 23 is positioned in adjacency relative to the second wall, with a plurality of resilient second tubes 24 secured in a tensioned manner between the second clamp plates 23, with the first and second resilient tubes 22 and 24 arranged in a generally spaced relationship relative to one another in continuous communcation to the top wall 18. A flexible web 25 is accordingly secured below the resilient first and second tubes 22 and 24 to simulate skin for suturing in practicing of such suturing relative to an exterior surface of a patient's body.

To simulate suturing within a body cavity, a rigid rod 26 is provided and selectively directed within one of said first wall apertures 14 and an associated one of said second wall apertures 16. The rigid rod 26 extends beyond the first and second walls and includes a first bore 27 and a second bore 28 that are arranged parallel relative to one another and are orthogonally oriented relative to an axis 26a of the rigid rod 26. Received within the first side wall is a first lock rod 29. in adjacency to the first side wall is a first lock rod 29. Removably mounted to the second bore 28 in adjacency to the second wall 15 exteriorly of the housing is a second lock rod 30. Accordingly, the first and second bores 27 and 28, as well as the first and second lock rods 29 and 30 are spaced apart a predetermined length substantially equal to a predetermined length as measured exteriorly of the first and second walls 12 and 15. A flexible tube 31 is mounted in surrounding relationship relative to the rigid rod 26 within the housing and between the first and second walls 12 and 15. In this manner, suturing about the flexible tube 31 is permitted in a manner to provide for suturing practice within a body cavity. The positioning of the rigid rod 26 within an associated aligned pair of first and second wall apertures 14 and 16 permits reorientation of the rod 26 for various orientations within a body cavity. The transparent nature of the walls, as well as the floor and top wall, permit visual access to the flexible tube 31 during a suturing procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the axact construction and operation shown and described, and accordingly, all suitable modifications and equivalents may be resorted to, falling within the scope of the invention.

What is claimed as being new and desired to be protected by Letters Patent of the United States is as follows:

1. A suture training device, comprising,
   a housing, the housing including a transparent floor plate, a transparent first wall, a transparent second wall, and a transparent top wall, and
   a first hinge member hingedly interconnecting the floor plate and the first wall together, and
   a second hinge member hingedly interconnecting the second wall and the floor plate together, and
   a third hinge member hingedly interconnecting the top wall and the second wall together, and
   a fourth hinge member hingedly interconnecting the first wall and the top wall together, and
   the first wall including a plurality of first wall bores spaced apart a predetermined spacing, the second wall including a plurality of second wall bores spaced apart said predetermined spacing, wherein each of said first wall bores is coaxially aligned with one of said second wall bores, and
   a rigid rod, the rigid rod slidably directed through one of said first wall bores and one of said second wall bores, and the rigid rod including a rigid rod first bore and a rigid rod second bore, the rigid rod first bore including a first lock rod directed therethrough, the rigid rod second bore including a second lock rod directed therethrough, wherein the first lock rod is positioned exteriorly of the housing in adjacency to the first wall, and the second lock rod is positioned in adjacency to the second wall exteriorly of the housing to selectively secure the rigid rod within the housing.

2. A training device as set forth in claim 1 including a flexible tube arranged in surrounding relationship relative to the rigid rod between the first wall and the second wall within the housing.

3. A training device as set forth in claim 2 wherein the first wall is transparent, the second wall is transparent, and the top wall is transparent, and wherein the top wall includes a plurality of first clamp plates mounted to a top surface of the top wall, wherein one of said first clamp plates is positioned in adjacency relative to the first wall, and a second of said first clamp plates is positioned in adjacency relative to the second wall, and at least one resilient first tube is arranged in tensioned securement between the first clamp plates and a plurality of second clamp plates, wherein one of said second clamp plates is positioned in adjacency relative to the first wall and a second of said second clamp plates is positioned in adjacency relative to the second wall, and a resilient second tube is mounted in tensioned relationship underlying the second clamp plates, and a flexible web is mounted in contiguous communication with the top wall below the first tube and the second tube.

* * * * *